US008144895B2

(12) United States Patent
Ura

(10) Patent No.: US 8,144,895 B2
(45) Date of Patent: Mar. 27, 2012

(54) HOWLING CONTROL APPARATUS AND ACOUSTIC APPARATUS

(75) Inventor: Takefumi Ura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 820 days.

(21) Appl. No.: 11/914,285

(22) PCT Filed: Apr. 18, 2006

(86) PCT No.: PCT/JP2006/308107

§ 371 (c)(1), (2), (4) Date: Nov. 13, 2007

(87) PCT Pub. No.: WO2006/123495

PCT Pub. Date: Nov. 23, 2006

(65) Prior Publication Data

US 2009/0080674 A1 Mar. 26, 2009

(30) Foreign Application Priority Data

May 18, 2005 (JP) ................................ 2005-145412

(51) Int. Cl.
*H04B 15/00* (2006.01)

(52) U.S. Cl. ........................................ 381/93; 381/94.1

(58) Field of Classification Search .................... 381/93, 381/94.1
See application file for complete search history.

(56) References Cited

U.S. PATENT DOCUMENTS

| | | | | |
|---|---|---|---|---|
| 5,442,712 | A * | 8/1995 | Kawamura et al. | 381/83 |
| 6,252,969 | B1 * | 6/2001 | Ando | 381/103 |
| 7,190,800 | B2 * | 3/2007 | Terada et al. | 381/93 |
| 7,912,230 | B2 * | 3/2011 | Kawamura et al. | 381/93 |

FOREIGN PATENT DOCUMENTS

| | | |
|---|---|---|
| JP | 3-115494 | 11/1991 |
| JP | 05-137191 | 6/1993 |
| JP | 05-308697 | 11/1993 |
| JP | 08-321796 | 12/1996 |
| JP | 2001-275182 | 10/2001 |
| JP | 2001-285986 | 10/2001 |
| JP | 2003-259480 | 9/2003 |
| JP | 2003-274480 | 9/2003 |
| JP | 2004-200883 | 7/2004 |
| JP | 2005-033771 | 2/2005 |

OTHER PUBLICATIONS

International Search Report Dated Aug. 15, 2006.

* cited by examiner

*Primary Examiner* — Phat X Cao

(74) *Attorney, Agent, or Firm* — Pearne & Gordon LLP

(57) ABSTRACT

It is an object of the present invention to provide a howling suppressing apparatus and an acoustic apparatus which can suppress the howling component effectively without suppressing a periodic component other than the howling component. The howling control apparatus comprises a signal separating unit 23 operable to separate an input signal into two components including a periodic component and a nonperiodic component, a howling detecting unit 24 operable to detect a howling component from the input signal on the basis of signals selected from among the input signal and periodic and nonperiodic component signals from the signal separating unit 23, a howling suppressing unit 25 operable to suppress the howling component of the input signal on the basis of detection information from the howling detecting unit 24, and a signal synthesizing unit 26 operable to synthesize a signal from signals from the howling suppressing unit 25.

15 Claims, 10 Drawing Sheets

HOWLING CONTROL APPARATUS AND ACOUSTIC APPARATUS

TECHNICAL FIELD OF THE INVENTION

The present invention relates to a howling control apparatus and an acoustic apparatus, and more particularly to a howling control apparatus for suppressing a howling component generated by an acoustic coupling between a microphone and a loudspeaker, and an acoustic apparatus provided with the howling control apparatus.

BACKGROUND OF THE INVENTION

In an acoustic apparatus having a microphone and a loudspeaker, a howling component may be generated as a result of the fact that a sound is outputted to the microphone from the loudspeaker as a feedback.

Up until now, there have been proposed a wide variety of howling suppressing apparatuses of this type, one typical example of which is adapted to extract a howling component from an input signal by using an adaptive filter, and to suppress the howling component by subtracting the howling component from the input signal (see, for example, patent document 1).

The following description is directed to the conventional howling control apparatus shown in FIG. 10.

As shown in FIG. 10, a delay unit 2 is adapted to delay an input signal received from a microphone through an input terminal 1. An adaptive filter 3 is adapted to extract a howling component from the signal delayed by the delay unit 2. An adder 4 is adapted to suppress the howling component by subtracting the howling component extracted by the adaptive filter 3 from the input signal, and to output the suppressed signal through an output terminal 5.

The operation of the conventional howling control apparatus disclosed in the patent document 1 will be described hereinafter with reference to FIG. 10.

In the howling control apparatus disclosed in the patent document 1, an input signal from the input terminal 1 is delayed by the delay unit 2. The convolution of the signal delayed by the delay unit 2 and filter coefficients is then performed by the adaptive filter 3. A signal delayed by a delay time equal to an integral multiple of the cycle of the howling component of the input signal is then generated by the adaptive filter 3.

The adder 4 suppresses the howling component of the input signal by subtracting the output signal of the adaptive filter 3 from the input signal, and outputs the suppressed signal to the adaptive filter 3 and an output terminal 5. The adaptive filter 3 updates the filter coefficients successively to minimize a mean square of the output signal of the adder 4.

The conventional howling control apparatus disclosed in the patent document 1 can suppress the howling component of the input signal by extracting the howling component from the input signal by using the adaptive filter 3, and subtracting the howling component from the input signal.

Patent document 1: Japanese published unexamined application No. 2001-275182 (see Page 5, FIG. 1)

DISCLOSURE OF THE INVENTION

Problems to be Solved by the Invention

The above-mentioned howling control apparatus, however, tends to reduce a quality of a sound to be outputted by a loudspeaker by suppressing a periodic component other than a howling component (such as for example a voiced sound) by reason that the above-mentioned howling control apparatus keeps the adaptive filter 3 in working condition all the time.

It is, therefore, an object of the present invention to provide a howling suppressing apparatus and an acoustic apparatus which can suppress the howling component effectively without suppressing a periodic component other than the howling component (such as for example a voiced sound), and improve a quality of a sound to be outputted by a loudspeaker.

Means for Solving the Problems

The howling control apparatus according to the present invention, comprises: a signal separating unit operable to separate an input signal into two components including a periodic component and a nonperiodic component; a howling detecting unit operable to detect a howling component from the input signal on the basis of signals selected from among the input signal and periodic and nonperiodic component signals from the signal separating unit; a howling suppressing unit operable to suppress the howling component of the input signal on the basis of detection information from the howling detecting unit; and a signal synthesizing unit operable to synthesize a signal from signals from the howling suppressing unit.

The howling control apparatus thus constructed as previously mentioned can suppress the howling component effectively without suppressing a periodic component other than the howling component (such as for example a voiced sound), and improve a quality of a sound to be outputted by a loudspeaker by separating an input signal into two components including a periodic component and a nonperiodic component, detecting a howling component from the input signal on the basis of signals selected from among the input signal and periodic and nonperiodic component signals, and suppressing the howling component of the input signal on the basis of detection information from the howling detecting unit.

In the howling control apparatus according to the present invention, the signal separating unit may have an adaptive filter operable to extract the periodic component from the input signal.

The howling control apparatus thus constructed as previously mentioned can detect and suppress the howling component effectively by separating the input signal into two components including a periodic component and a nonperiodic component.

In the howling control apparatus according to the present invention, the howling detecting unit may include a signal level calculating section operable to calculate signal levels of the selected signals, a signal ratio calculating section operable to calculate a ratio between the signal levels, and a howling judging section operable to judge whether or not the howling component is contained in the input signal on the basis of the ratio between the signal levels of the periodic and nonperiodic components calculated by the signal ratio calculating section.

The howling control apparatus thus constructed as previously mentioned can detect the howling component from the input signal with accuracy by judging whether or not the howling component is contained in the input signal on the basis of the ratio between the signal levels of the periodic and nonperiodic components calculated by the signal ratio calculating section.

In the howling control apparatus according to the present invention, the howling detecting unit may further include a fluctuation analyzing section operable to perform an analysis of a fluctuation of a signal level of the periodic component signal. The howling judging section may judge whether or not the howling component is contained in the input signal on the basis of the ratio between the signal levels of the periodic and nonperiodic components calculated by the signal ratio calculating section and the analysis of the fluctuation of the signal level of the periodic component signal performed by the fluctuation analyzing section.

The howling control apparatus thus constructed as previously mentioned can detect the howling component from the input signal with accuracy by distinguishing the howling component from a periodic component other than the howling component by performing an analysis of a fluctuation of a signal level of the periodic component signal and a fluctuation of a signal level of the nonperiodic component signal.

In the howling control apparatus according to the present invention, the fluctuation analyzing section may calculate a difference between a past signal level of the periodic component signal and a present signal level of the periodic component signal.

The howling control apparatus thus constructed as previously mentioned can distinguish the howling component from a periodic component other than the howling component, and detect the howling component from the input signal with accuracy by analyzing the ratio between the signal levels of the periodic and nonperiodic components calculated by the signal ratio calculating section and the difference between the past signal level of the periodic component and the present signal level of the periodic component.

In the howling control apparatus according to the present invention, the fluctuation analyzing section may compare a past signal level of the periodic component signal with a present signal level of the periodic component signal.

The howling control apparatus thus constructed as previously mentioned can distinguish the howling component from a periodic component other than the howling component by comparing a past signal level of the periodic component signal with a present signal level of the periodic component signal.

In the howling control apparatus according to the present invention, the howling suppressing means may include a gain control section operable to control at least one gain to be used to suppress the howling component, and a gain multiplying section operable to multiply the periodic component signal from the signal separating unit by a gain controlled by the gain control section, or multiplying the periodic and nonperiodic component signals from the signal separating unit by gains controlled by the gain control section.

The howling control apparatus thus constructed as previously mentioned can suppress the howling component effectively, and improve a quality of a sound to be outputted by a loudspeaker by controlling one or more gains to be used to suppress the howling component.

In the howling control apparatus according to the present invention, the howling suppressing means may further include a measuring section operable to measure a duration of the howling component or a duration of the input signal judged as having no howling component. The gain control section may control at least one gain in response to the detection information from the howling detecting unit and the duration measured by the measuring section.

The howling control apparatus thus constructed as previously mentioned can suppress the howling component effectively, and improve a quality of a sound to be outputted by a loudspeaker by controlling one or more gains to be used to suppress the howling component.

In the howling control apparatus according to the present invention, the howling detecting unit may perform a howling component detecting operation at specific intervals. The howling suppressing unit may perform a howling component suppressing operation at specific intervals.

The howling control apparatus thus constructed as previously mentioned can reduce a load required to perform the howling component suppressing operation.

The howling control apparatus according to the present invention may further comprise a display unit operable to notify a user about whether or not the howling component is contained in the input signal by displaying an image on the basis of the detection information from the howling detecting unit.

The howling control apparatus thus constructed as previously mentioned can visually recognize a user of the howling component by displaying current condition of the howling component.

The howling control apparatus according to the present invention may further comprise a notification sound generating unit operable to notify a user about whether or not the howling component is contained in the input signal by generating a notification sound on the basis of the detection information from the howling detecting unit.

The howling control apparatus thus constructed as previously mentioned can notify a user of current condition of the input signal by generating a notification sound on the basis of the howling component detected by the howling detecting means.

The howling control apparatus according to the present invention may further comprise a vibration generator operable to notify a user about whether or not the howling component is contained in the input signal by generating a vibration on the basis of the detection information from the howling detecting unit.

The howling control apparatus thus constructed as previously mentioned can notify a user of current condition of the input signal by generating a vibration on the basis of the howling component detected by the howling detecting means.

The acoustic apparatus according to the present invention comprises the above-mentioned howling control apparatus.

The acoustic apparatus thus constructed as previously mentioned can suppress the howling component effectively without suppressing a periodic component other than the howling component (such as for example a voiced sound), and improve a quality of a sound to be outputted by a loudspeaker by reducing a harsh sound.

Effect of the Invention

It is an object of the present invention to provide a howling control apparatus and an acoustic apparatus can suppress the howling component effectively without suppressing a periodic component other than the howling component (such as for example a voiced sound), and improve a quality of a sound to be outputted by a loudspeaker by reducing a harsh sound.

DESCRIPTION OF THE REFERENCE NUMERALS

Figure 1:
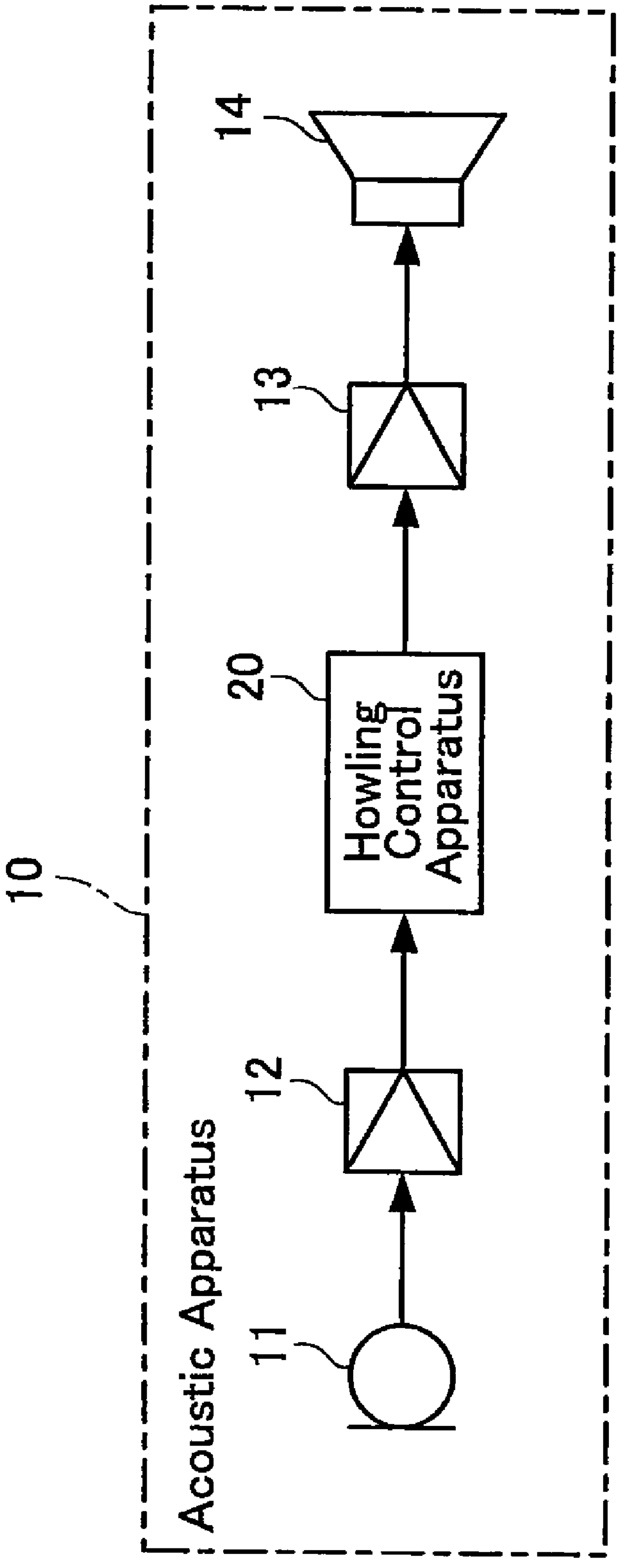
FIG. 1 is a block diagram showing the acoustic apparatus according to the first embodiment of the present invention.

10: acoustic apparatus
11: microphone
12: microphone amplifier
13: power amplifier
14: loudspeaker
20: howling control apparatus
22: A/D converter
23: signal separating unit (signal separating means)
24: howling detecting unit (howling detecting means)
25: howling suppressing unit (howling suppressing means)
26: signal synthesizing unit (signal synthesizing means)
27: D/A converter
29: delay unit
30: adaptive filter
31: adder
42: signal level calculating section
43: signal ratio calculating section
44 and 62: howling judging section
53 and 72: gain control section
54: gain multiplying section
61: fluctuation analyzing section
71: measuring section
81: display unit (display means)
82: notification sound generating unit (notification sound generating means)
83: adder (notification sound generating means)
84: vibration generator (vibration generating means)

DETAILED DESCRIPTION OF THE INVENTION

The first to sixth embodiments of howling control apparatus and acoustic apparatus according to the present invention are described hereinafter with reference to accompanying drawings.

First Embodiment

FIGS. 1 to 4 are block diagrams showing the howling control apparatus and acoustic apparatus according to the first embodiment of the present invention.

The following description is directed to the construction of the howling control apparatus and acoustic apparatus according to the first embodiment. As shown in FIGS. 1 to 4, the acoustic apparatus 10 comprises a microphone 11 for receiving a sound, a microphone amplifier 12 for amplifying a sound signal from the microphone 11, a howling control apparatus 20 for detecting and suppressing a howling component of a sound signal from the microphone amplifier 12, a power amplifier 13 for amplifying a signal from the howling control apparatus 20, and a loudspeaker 14 for outputting a sound in response to a signal from the power amplifier 13.

Figure 2:
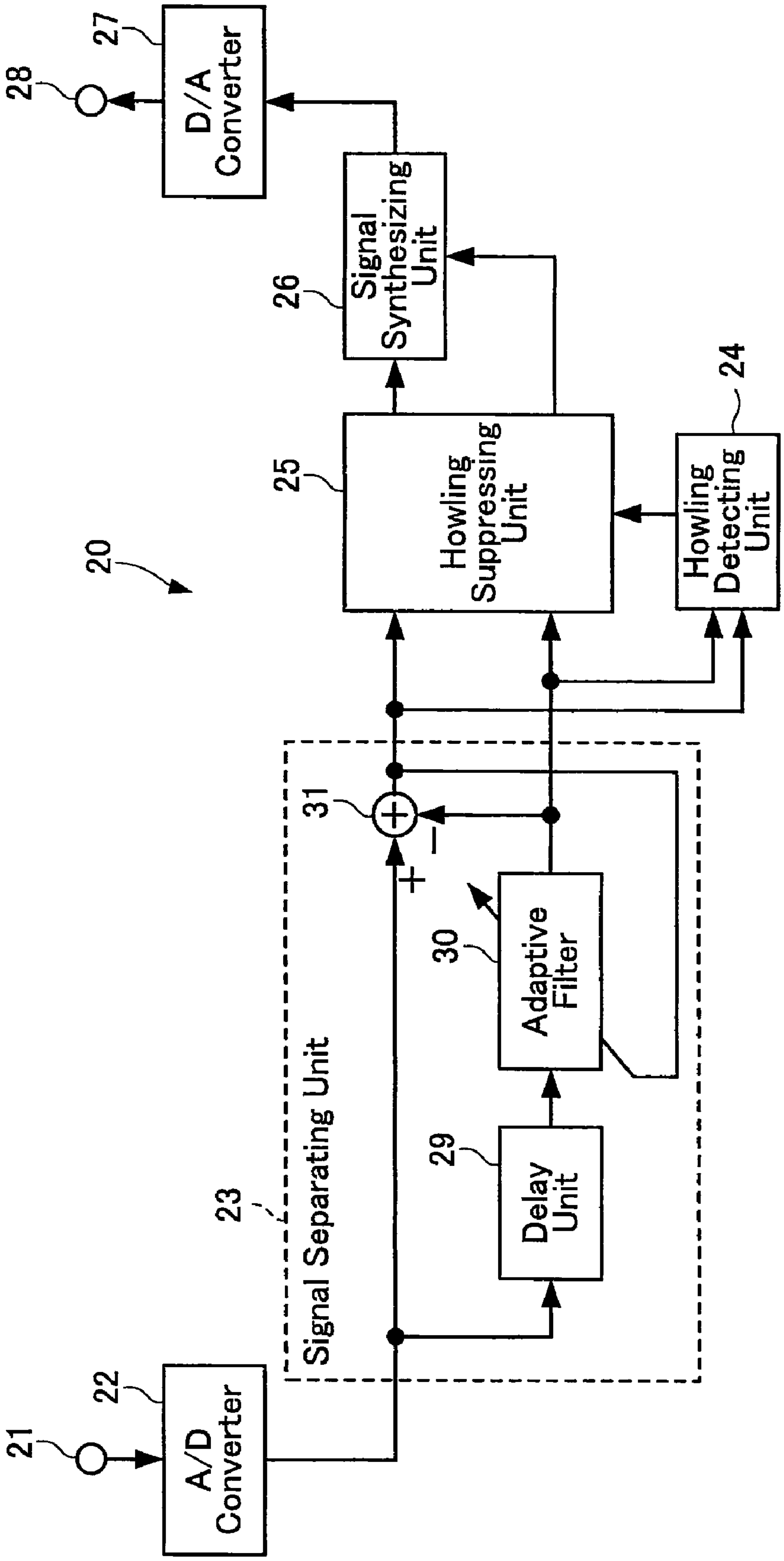
FIG. 2 is a block diagram showing the howling control apparatus according to the first embodiment of the present invention.

As shown in FIG. 2, the howling control apparatus 20 comprises an input terminal 21 through which an analog signal is received from a microphone 11, an A/D converter 22 for converting the analog signal from the input terminal 21 to a digital signal, a signal separating unit (signal separating means) 23 for separating a signal from the A/D converter 22 into two components including a periodic component and a nonperiodic component, a howling detecting unit (howling detecting means) 24 for detecting a howling component by comparing periodic and nonperiodic component signals from the signal separating unit 23 with threshold values stored in a memory, a howling suppressing unit (howling suppressing means) 25 for suppressing the howling component in response to the howling component detected by the howling detecting unit 24, a signal synthesizing unit (signal synthesizing means) 26 for synthesizing a signal from the periodic and nonperiodic component signals from the howling suppressing unit 25, a D/A converter 27 for converting the signal from the signal synthesizing unit 26 to an analog signal, and an output terminal 28 through which the analog signal from the D/A converter 27 is outputted to a power amplifier 13.

The signal separating unit 23 is constituted by a computer having a CPU (Central Processing Unit), an ROM (Read Only Memory), an RAM (Random Access Memory), a memory, and the like. The signal separating unit 23 comprises a delay unit 29 for producing a reference signal to be outputted to an adaptive filter 30 by delaying the signal from the A/D converter 22, an adaptive filter 30 for performing a convolution of the reference signal from the delay unit 29 and filter coefficients, and updating the filter coefficients successively, and an adder 31 for calculating a difference between the signal from the A/D converter 22 and a signal from the adaptive filter 30.

Figure 3:
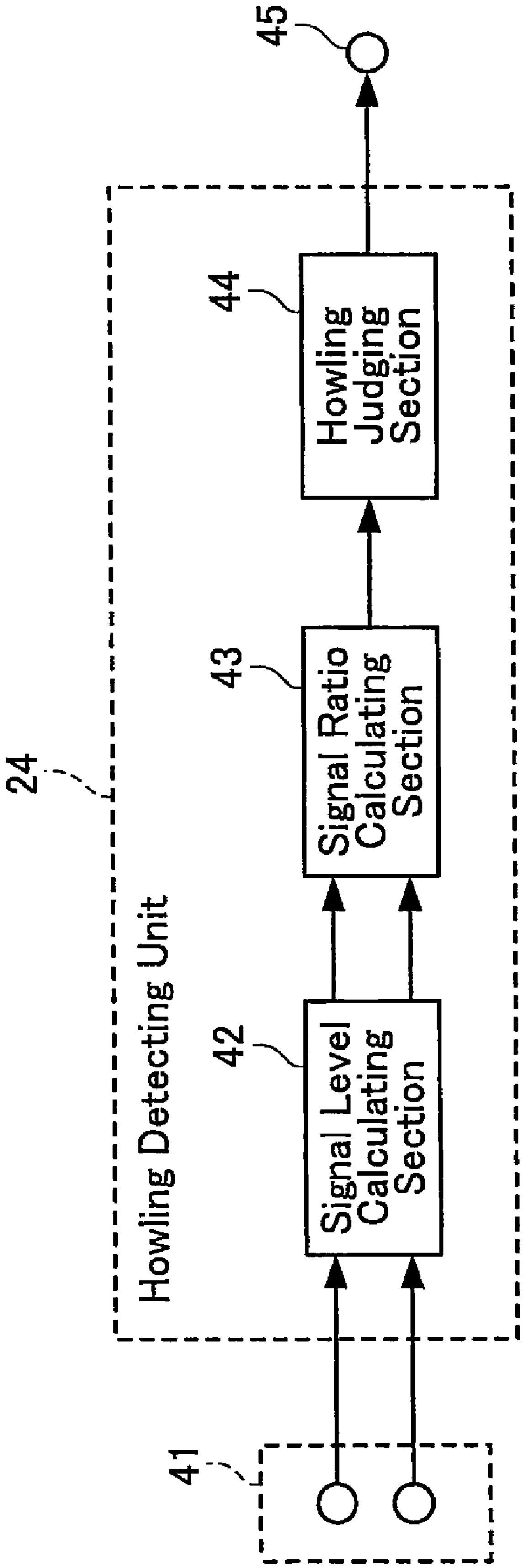
FIG. 3 is a block diagram showing the howling detecting unit of the howling control apparatus according to the first embodiment of the present invention.

The howling detecting unit 24 is constituted by the above-mentioned computer. As shown in FIG. 3, the howling detecting unit 24 includes an input terminal 41 through which the periodic and nonperiodic component signals are received from the signal separating unit 23, a signal level calculating section 42 for calculating signal levels of the periodic and nonperiodic component signals from the input terminal 41, a signal ratio calculating section 43 for calculating a ratio between the signal levels calculated by the signal level calculating section 42, a howling judging section 44 for judging whether or not the howling component is contained in the input signal on the basis of the ratio calculated by the signal ratio calculating section 43, and an output terminal 45 through which the judgment made by the howling judging section 44 is outputted as a detection signal.

Figure 4:
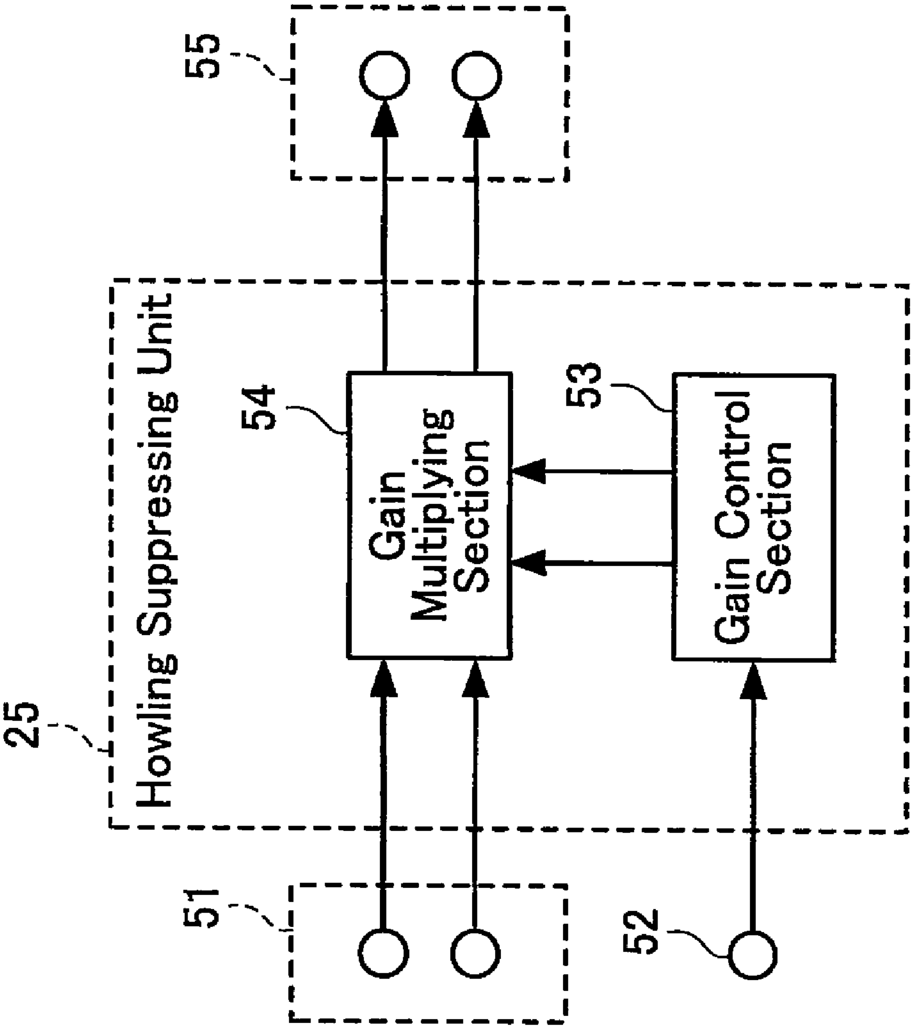
FIG. 4 is a block diagram showing the howling suppressing unit of the howling control apparatus according to the first embodiment of the present invention.

The howling suppressing unit 25 is constituted by the above-mentioned computer. As shown in FIG. 4, the howling suppressing unit 25 includes an input terminal 51 through which the periodic and nonperiodic component signals are received from the signal separating unit 23, an input terminal 52 through which the detection signal is received from the howling detecting unit 24, a gain control section 53 for controlling gains in response to the detection signal from the input terminal 52, a gain multiplying section 54 for multiplying the periodic and nonperiodic component signals from the input terminal 51 by the gains controlled by the gain control section 53, and an output terminal 55 through which the periodic and nonperiodic component signals multiplied by the gains is outputted by the gain multiplying section 54 to the signal synthesizing unit 26.

The following description is directed to the operation of the howling control apparatus 20 according to the first embodiment of the present invention. In this embodiment, the periodic and nonperiodic component signals are inputted to the howling detecting unit 24 from the signal separating unit 23.

The A/D converter 22 converts an analog signal received from the microphone 11 through the input terminal 21 to a digital signal to be outputted to the signal separating unit 23. The digital signal from the A/D converter 22 is then separated into two components including a periodic component and a nonperiodic component by the signal separating unit 23. The periodic and nonperiodic components are respectively outputted as a periodic and a nonperiodic component signal to each of the input terminal 41 of the howling detecting unit 24 and the input terminal 51 of the howling suppressing unit 25.

The signal separating unit 23 receives the output signal of the A/D converter 22 as a target signal, while the adaptive filter 30 receives the target signal delayed by the delay unit 29 as a reference signal.

Here, the delay unit 29 has a delay time which is long enough to prevent the target signal from having correlation with the reference signal. The adaptive filter 30 performs a convolution of the reference signal and the filter coefficients. The adder 31 outputs a difference signal indicative of a difference between the output signal of the A/D converter 22 and the signal from the adaptive filter 30 by subtracting an output signal of the adaptive filter 30 from the target signal.

The adaptive filter 30 updates the filter coefficients repeatedly to minimize a mean square of the difference between the signal level of the target signal and the signal level of the reference signal by reason that it is possible to extract a periodic component such as a howling component from the input signal by minimizing the mean square of the difference between the signal level of the target signal and the signal level of the reference signal.

In this embodiment, conventional filter coefficient update algorithm such as NLMS (Normalized Least Mean Square) algorithm is used to have the adaptive filter 30 update the filter coefficients. As a result, the signal separating unit 23 outputs two signals including a signal indicative of the periodic component of the input signal, i.e., the output signal of the adaptive filter 30, and a signal indicative of the nonperiodic component of the input signal.

In the howling detecting unit 24, the signal levels of the periodic and nonperiodic component signals from the input terminal 41 are calculated by the signal level calculating section 42. The signal ratio calculating section 43 calculates the ratio between the signal levels of the periodic and nonperiodic component signals from the signal level calculating section 42. The periodic component signal becomes larger with time when the howling component is generated in the input signal, while the nonperiodic component signal becomes smaller with time. As a result, the ratio between the signal levels of the periodic and nonperiodic component signals becomes larger with time, and is maintained at high level. The detection of the howling component is performed on the basis of the above-mentioned features of the periodic and nonperiodic component signals.

The howling judging section 44 compares the ratio between the signal levels of the periodic and nonperiodic component signals calculated by the signal ratio calculating section 43 with a first threshold value stored in the memory, and increments a first counter value stored in the memory when the ratio between the signal levels exceeds the first threshold value.

When the first counter value exceeds a second threshold value, the howling judging section 44 judges that the ratio between the signal levels is maintained at a high value, and judges that the howling component is contained in the input signal. Then, the howling judging section 44 judges whether or not the ratio between the signal levels exceeds a third threshold value. When the ratio between the signal levels is less than the third threshold value, the howling judging section 44 increases a second counter value stored in the memory. When the second counter value exceeds a fourth threshold value, the howling component is judged by the howling judging section 44 as being fully converged without being contained in the input signal. The judgment of the howling judging section 44 is then outputted to the howling suppressing unit 25 through output terminal 45 and the input terminal 52.

When the judgment is made that the howling component is contained in the input signal on the basis of the detection information from the howling detecting unit 24, the howling suppressing unit 25 starts to suppress the howling component of the input signal.

The gain multiplying section 54 has gains each of which is equal to 1.0 in an initial state, and has the periodic and nonperiodic component signals passed therethrough without amplifying the periodic and nonperiodic component signals in the initial state. The gain control section 53 controls the gains of the gain multiplying section 54, while the gain multiplying section 54 multiplies the periodic and nonperiodic component signals from the input terminal 51 by the gains controlled by the gain control section 53. The periodic and nonperiodic component signals multiplied by the gain multiplying section 54 are outputted through the output terminal 55.

The signal synthesizing unit 26 synthesizes a signal from the periodic and nonperiodic component signals outputted through the output terminal 55, while the D/A converter 27 performs the digital-to-analog conversion of the signal synthesized by the signal synthesizing unit 26.

The analog signal is then outputted to the power amplifier 13 through the output terminal 28, and amplified by the power amplifier 13. The loudspeaker 14 outputs a sound in response to the analog signal amplified by the power amplifier 13.

From the foregoing description, it will be understood that the howling control apparatus and acoustic apparatus according to the first embodiment of the present invention can suppress the howling component effectively without suppressing a periodic component other than the howling component (such as for example a voiced sound), and improve a quality of a sound to be outputted by a loudspeaker by reducing a harsh sound by separating the input signal including an original sound component and a howling component into two component including a periodic component and a nonperiodic component, detecting the howling component on the basis of the periodic and nonperiodic component signals and suppressing the howling component on the basis of the detection information from the howling detecting unit.

In this embodiment, the howling control apparatus and acoustic apparatus can perform the detection and suppression of the howling component effectively by including an adaptive filter 30 operable to extract the periodic component from the input signal.

In this embodiment, the howling control apparatus and acoustic apparatus can perform the detection of the howling component accurately by calculating the signal levels of the periodic and nonperiodic component signals, calculating the ratio between the signal levels of the periodic and nonperiodic component signals, and judging whether or not the howling component is contained in the input signal on the basis of the ratio between the signal levels of the periodic and nonperiodic component signals.

The howling suppressing apparatus according to the first embodiment of the present invention can suppress the howling component effectively, and attain further improvement of a quality of a sound to be outputted by a loudspeaker by reason that the howling suppressing unit 25 controls gains to be used to suppress the howling component in response to the detection information from the howling detecting unit 24, and the gain multiplying section 54 multiplies the periodic and nonperiodic component signals from the signal separating unit 23 by the gains calculated by the gain control section 53.

In this embodiment, the acoustic apparatus 10 can reduce a harsh sound, and improve the gain of the microphone amplifier 12 or the power amplifier 13 by reason that the howling control apparatus detects the howling component accurately, and suppresses the howling component to improve a quality of a sound to be outputted by a loudspeaker.

In this embodiment, the howling detecting unit 24 detects the howling component by using the ratio between the signal levels of the periodic and nonperiodic component signals from the signal separating unit 23. However, the howling detecting unit 24 may detect the howling component by using other ratio such as for example a ratio between the signal level of the input signal and the signal level of the periodic component signal.

In this embodiment, the howling suppressing unit 25 suppresses the howling component by controlling gains for signals (periodic and nonperiodic components) from the signal separating unit 23. However, the howling suppressing unit 25 may suppress the howling component by controlling a gain for the periodic component signal.

The howling detecting unit 24 and howling suppressing unit 25 may perform the detection and suppression of the howling component discontinuously, for example, at a rate of one time per samples. This leads to the fact that the howling control apparatus can reduce the workload of the detection and suppression of the howling component.

Second Embodiment

Figure 5:
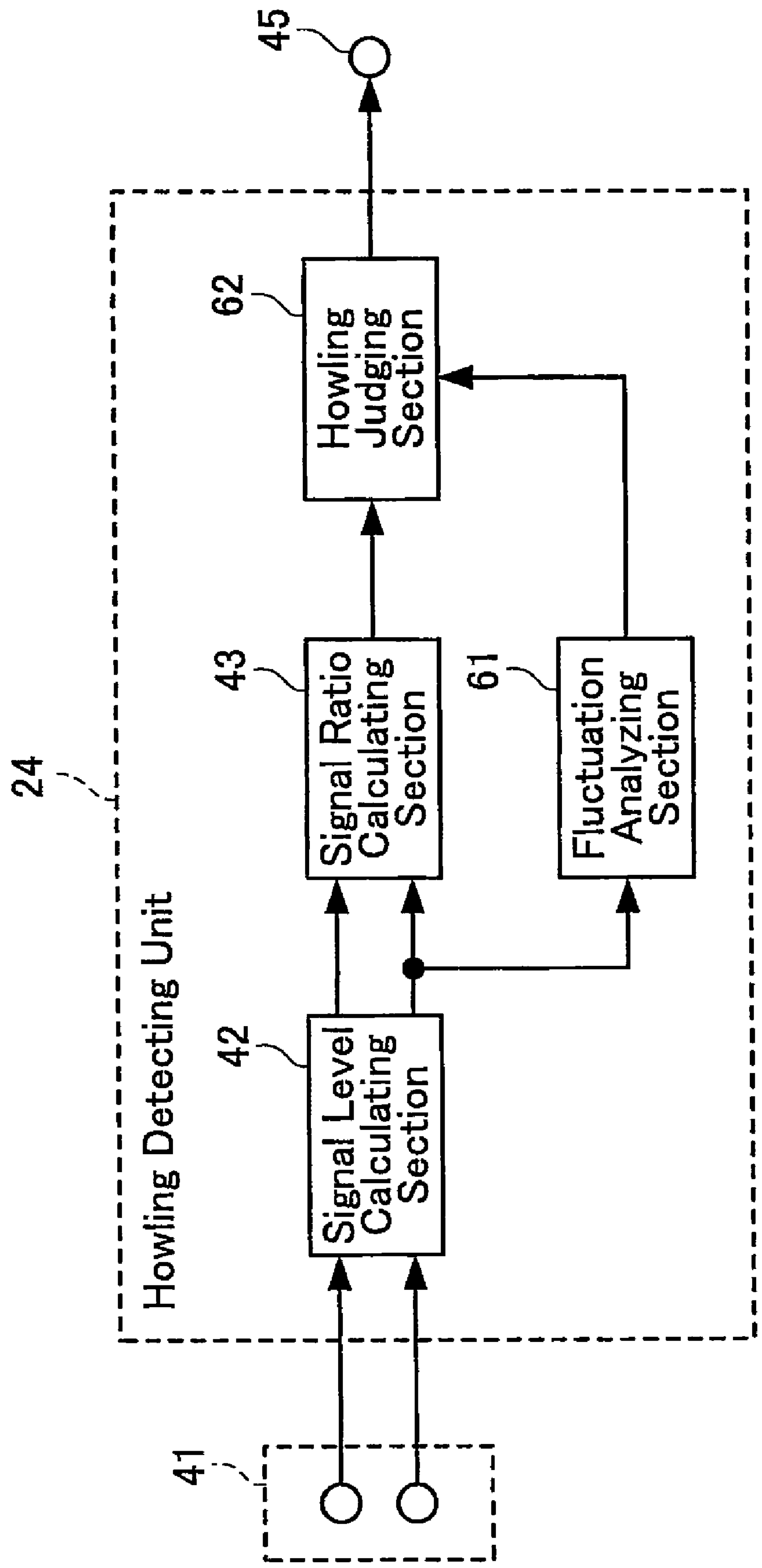
FIG. 5 is a block diagram showing the howling detecting unit of the howling control apparatus according to the second embodiment of the present invention.

FIG. 5 is a block diagram showing a howling control apparatus and an acoustic apparatus according to the second embodiment of the present invention. The elements of the howling control apparatus and acoustic apparatus according to the second embodiment the same as those of the howling control apparatus and acoustic apparatus according to the first embodiment are not described, but bear the same reference numerals as those of the howling control apparatus and acoustic apparatus according to the first embodiment.

As shown in FIG. 5, the howling detecting unit 24 of the howling control apparatus 20 includes a fluctuation analyzing section 61 operable to analyze a fluctuation of the signal level of the periodic component signal calculated by the signal level calculating section 42, and a howling judging section 62 operable to judge whether or not the howling component is contained in the input signal on the basis of the ratio between the signal levels calculated by the signal ratio calculating section 43 and the analysis of the fluctuation of the signal level performed by the fluctuation analyzing section 61. In terms of the signal level of the periodic component signal calculated by the signal level calculating section 42, the signal level of the periodic component signal increases with time when the howling component is contained in the input signal. On the other hand, the signal level of the periodic component signal (such as for example voiced sounds) other than the howling component fluctuates over time when the howling component is not contained in the input signal. The howling detecting unit 24 performs the detection of the howling component by making use of the difference between the feature of the howling component and the feature of the periodic component signal other than the howling component.

In this embodiment, the fluctuation analyzing section 61 calculates and analyzes the difference between a past and a present signal level of the periodic component signal.

The following description is directed to the operation of the howling detecting unit 24 of the howling control apparatus 20 according to the third embodiment. In this embodiment, the periodic and nonperiodic component signals are inputted to the howling detecting unit 24 from the signal separating unit 23.

The fluctuation analyzing section 61 calculates a difference value indicating the difference between a past and a present signal level of the periodic component signal from the signal level calculating section 42, and outputs the difference value to the howling judging section 62. Here, the term "past signal level" is intended to indicate a signal level of the periodic component signal delayed by a delay unit (not shown).

In this embodiment, threshold levels and counter values are stored in a memory of the howling judging section 62. The howling judging section 62 compares the signal ratio from the signal ratio calculating section 43 with a first threshold value, and increases a first counter value when the signal ratio exceeds the first threshold value.

The howling judging section 62 then compares the difference value from the fluctuation analyzing section 61 with a second threshold value, and increases a second counter value when the difference value exceeds the second threshold value.

When the first counter value exceeds a third threshold value and the second counter value exceeds a fourth threshold value, the howling judging section 62 judges that the ratio between the signal levels is maintained at a high value, and the signal level of the periodic component signal is increasing with time, and thus judges that the howling component is contained in the input signal. Then, the howling judging section 62 judges whether or not the ratio between the signal levels exceeds a fifth threshold value. When the ratio between the signal levels is less than the fifth threshold value, the howling judging section 62 increases a third counter value stored in the memory. When the third counter value exceeds a sixth threshold value, the howling component is judged by the howling judging section 62 as being fully converged without being contained in the input signal.

From the foregoing description, it will be understood that the howling control apparatus and acoustic apparatus according to the second embodiment of the present invention can distinguish the howling component from the periodic component signal other than the howling component, and detect the howling component accurately by reason that the howling detecting unit 24 includes a fluctuation analyzing section 61 operable to analyze a fluctuation of the signal level of the periodic component signal calculated by the signal level calculating section 42, and a howling judging section 62 operable to judge whether or not the howling component is contained in the input signal on the basis of the ratio between the signal levels calculated by the signal ratio calculating section 43 and the analysis of the fluctuation of the signal level performed by the fluctuation analyzing section 61.

In this embodiment, the fluctuation analyzing section 61 calculates the difference between a past and a present signal level of the periodic component signal. However, the fluctuation analyzing section 61 may compare a past and a present signal level of one or more signals selected from among signals including an input signal and outputs signals of the signal separating unit 23, or may make a comparison of the past and the present signal level of the selected signal. The howling judging section 62 may judge whether or not the howling component is contained in the input signal by using the comparison of the past and the present signal level of the selected signal.

Third Embodiment

Figure 6:
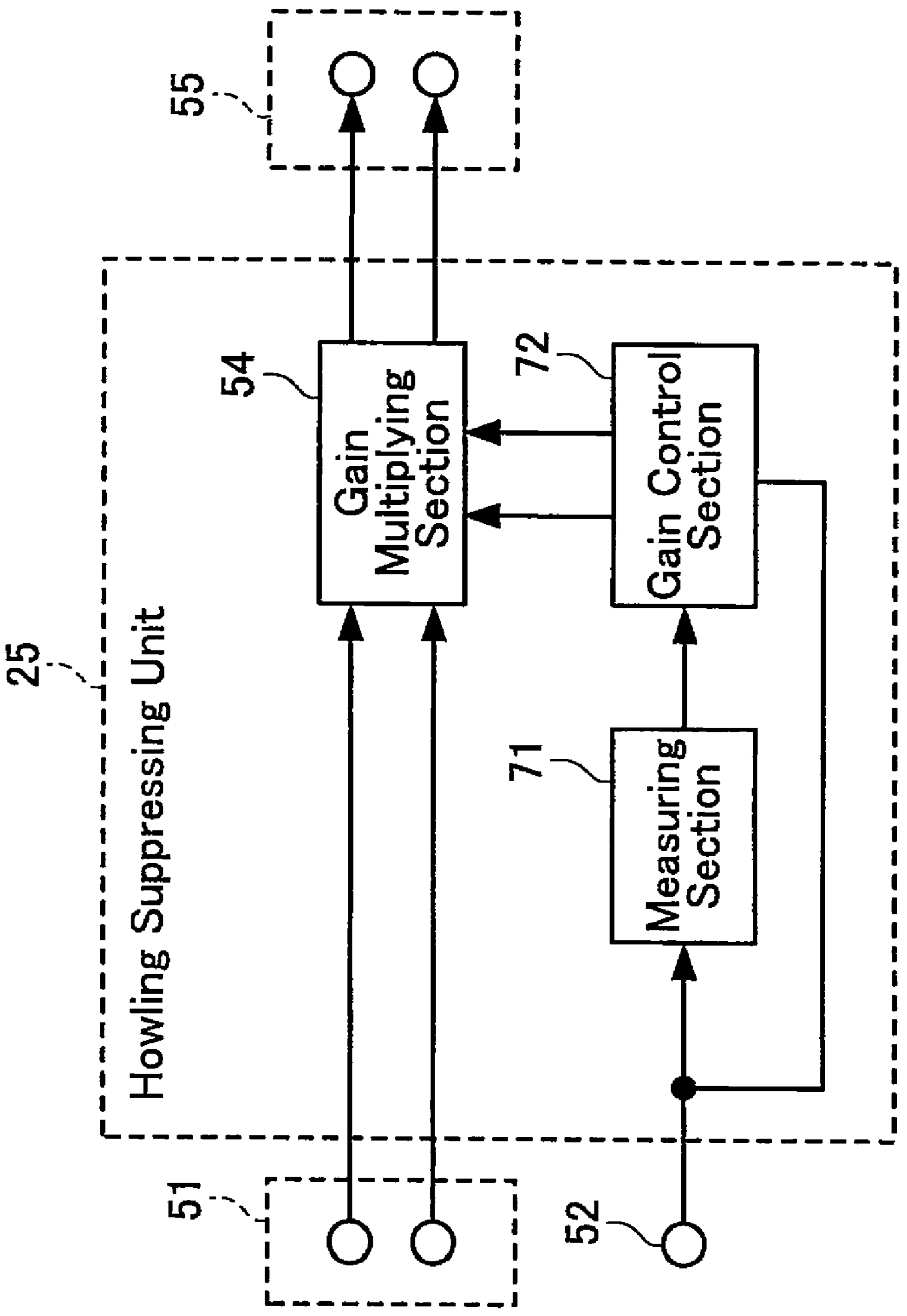
FIG. 6 is a block diagram showing the howling suppressing unit of the howling control apparatus according to the third embodiment of the present invention.

FIG. 6 is a block diagram showing a howling control apparatus and an acoustic apparatus according to the third embodiment of the present invention. The elements of the howling control apparatus and acoustic apparatus according to the third embodiment the same as those of the howling control apparatus and acoustic apparatus according to the first embodiment are not described, but bear the same reference numerals as those of the howling control apparatus and acoustic apparatus according to the first embodiment.

As shown in FIG. 6, the howling suppressing unit 25 of the howling control apparatus 20 includes a measuring section 71 operable to measure duration of a signal judged as having a howling component or a signal judged as not having a howling component on the basis of the detection information from the howling detecting unit 24, and a gain control section 72 operable to control one or more gains in response to the detection information from the input terminal 52 and the measurement information from the measuring section 71.

The following description is directed to the operation of the howling suppressing unit 25 of the howling control apparatus 20 according to the third embodiment.

The duration of the signal judged as having a howling component or the signal judged as not having a howling component is measured by the measuring section 71 on the basis of the detection information from the howling detecting unit 24, and outputted to the gain control section 72.

The gains are controlled by the gain control section 72 in response to the detection information from the input terminal 52 and the measurement information from the measuring section 71. When, for example, the howling component is detected over a long duration, the judgment is made that a closed loop gain is large. Then, the gains are significantly reduced by the gain control section 72. When, on the other hand, the howling component is not detected over a long duration, the judgment is made that a closed loop gain is small. Then, the gains are slightly reduced by the gain control section 72.

From the foregoing description, it will be understood that the howling control apparatus and acoustic apparatus according to the third embodiment of the present invention can suppress the howling component effectively, and attain further improvement of a quality of a sound to be outputted by a loudspeaker by controlling one or more gains in response to the detection information about the howling component.

While there has been described in the third embodiment about the fact that the gain control section 72 reduces one or more gains in response to the detection information about the howling component, the gain control section 72 may restore the reduced gains to normal when the howling component is not detected over a long duration.

Fourth Embodiment

Figure 7:
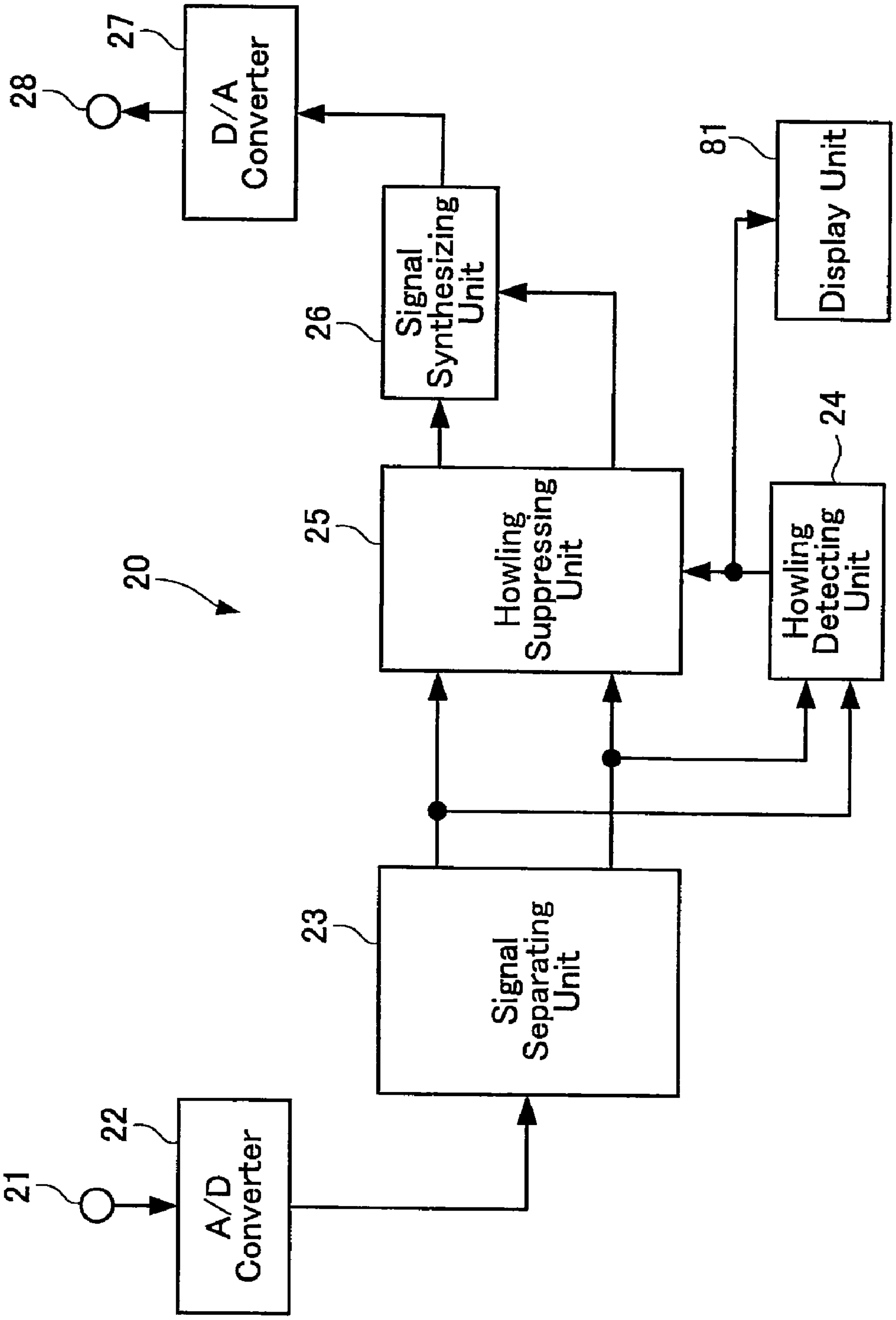
FIG. 7 is a block diagram showing the howling control apparatus according to the fourth embodiment of the present invention.

FIG. 7 is a block diagram showing a howling control apparatus and an acoustic apparatus according to the fourth embodiment of the present invention. The elements of the howling control apparatus and acoustic apparatus according to the fourth embodiment the same as those of the howling control apparatus and acoustic apparatus according to the first embodiment are not described, but bear the same reference numerals as those of the howling control apparatus and acoustic apparatus according to the first embodiment.

As shown in FIG. 7, the howling control apparatus 20 comprises elements the same as those of the howling control apparatus according to the first embodiment, and a display unit (display means) 81 such as a liquid crystal display and an LED lamp. The display unit 81 displays information about the detected howling component on the basis of the detection information from the howling detecting unit 24.

The following description is directed to the operation of the howling control apparatus 20 according to the fourth embodiment.

The display unit 81 displays information about the detected howling component on a screen on the basis of the detection information from the howling detecting unit 24 by using, for example, pictures, letters and colors, or by using different states, for example, “an LED lamp is on”, “an LED lamp is on and off”, and “an LED lamp is on with different colors”.

From the foregoing description, it will be understood that the howling control apparatus and acoustic apparatus of the fourth embodiment of the present invention can notify a user about whether or not the howling component is detected from the input signal by reason that the display unit 81 displays information about the detected howling component on the basis of the detection information from the howling detecting unit 24.

Fifth Embodiment

Figure 8:
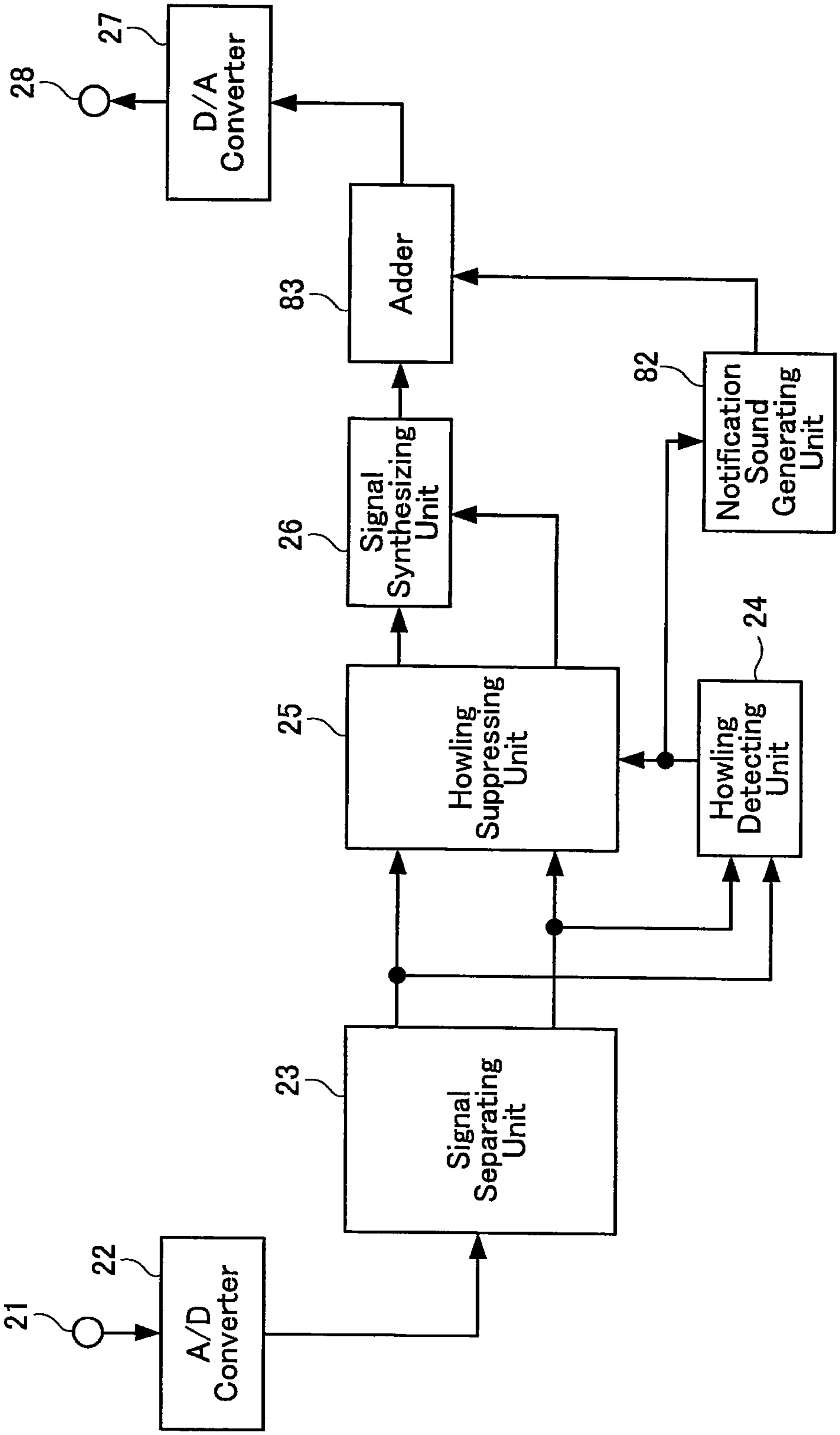
FIG. 8 is a block diagram showing the howling control apparatus according to the fifth embodiment of the present invention.

FIG. 8 is a block diagram showing a howling control apparatus and an acoustic apparatus according to the fifth embodiment of the present invention. The elements of the howling control apparatus and acoustic apparatus according to the fifth embodiment the same as those of the howling control apparatus and acoustic apparatus according to the first embodiment are not described, but bear the same reference numerals as those of the howling control apparatus and acoustic apparatus according to the first embodiment.

As shown in FIG. 8, the howling control apparatus 20 comprises elements the same as those of the howling control apparatus according to the first embodiment, and a notification sound generating unit 82 operable to generate, on the basis of the detection information from the howling detecting unit 24, a signal to be used as a notification sound to notify a user about whether or not the howling component is detected from the input signal, and an adder 83 operable to add the signal generated by the notification sound generating unit 82 to the signal synthesized by the signal synthesizing unit 26, and outputting a signal to the loudspeaker 14. In this embodiment, the notification sound generating unit 82, the adder 83, and the loudspeaker 14 are collectively constituted as notification sound generating unit.

The following description is directed to the operation of the howling control apparatus 20 according to the fifth embodiment.

The notification sound generating unit 82 generates, on the basis of the detection information from the howling detecting unit 24, a signal to be used as a notification sound to notify a user about whether or not the howling component is detected from the input signal, and outputs the signal to the adder 83.

The adder 83 adds the signal generated by the notification sound generating unit 82 to the signal synthesized by the signal synthesizing unit 26, and outputs a signal to the D/A converter 27. Then, the D/A converter 27 perform the digital to analog conversion of the signal from the adder 83. The signal from the D/A converter 27 is then amplified by the power amplifier 13. The notification sound is outputted by the loudspeaker 14 in response to the signal from the power amplifier 13.

From the foregoing description, it will be understood that the howling control apparatus and acoustic apparatus according to the fifth embodiment of the present invention can notify a user of the howling component detected from the input signal by allowing the user to receive a notification sound as information about whether or not the howling component is detected from the input signal by reason that the loudspeaker 14 outputs a notification sound to notify a user of the howling component detected from the input signal.

While there has been described in the fifth embodiment about the fact that the adder 83 provided after the D/A converter 27 adds the signal generated by the notification sound generating unit 82 to the signal synthesized by the signal synthesizing unit 26, and to output a signal to the loudspeaker 14. In this embodiment, the notification sound generating unit 82, the adder 83, and the loudspeaker 14 collectively constitute notification sound generating means.

Sixth Embodiment

Figure 9:
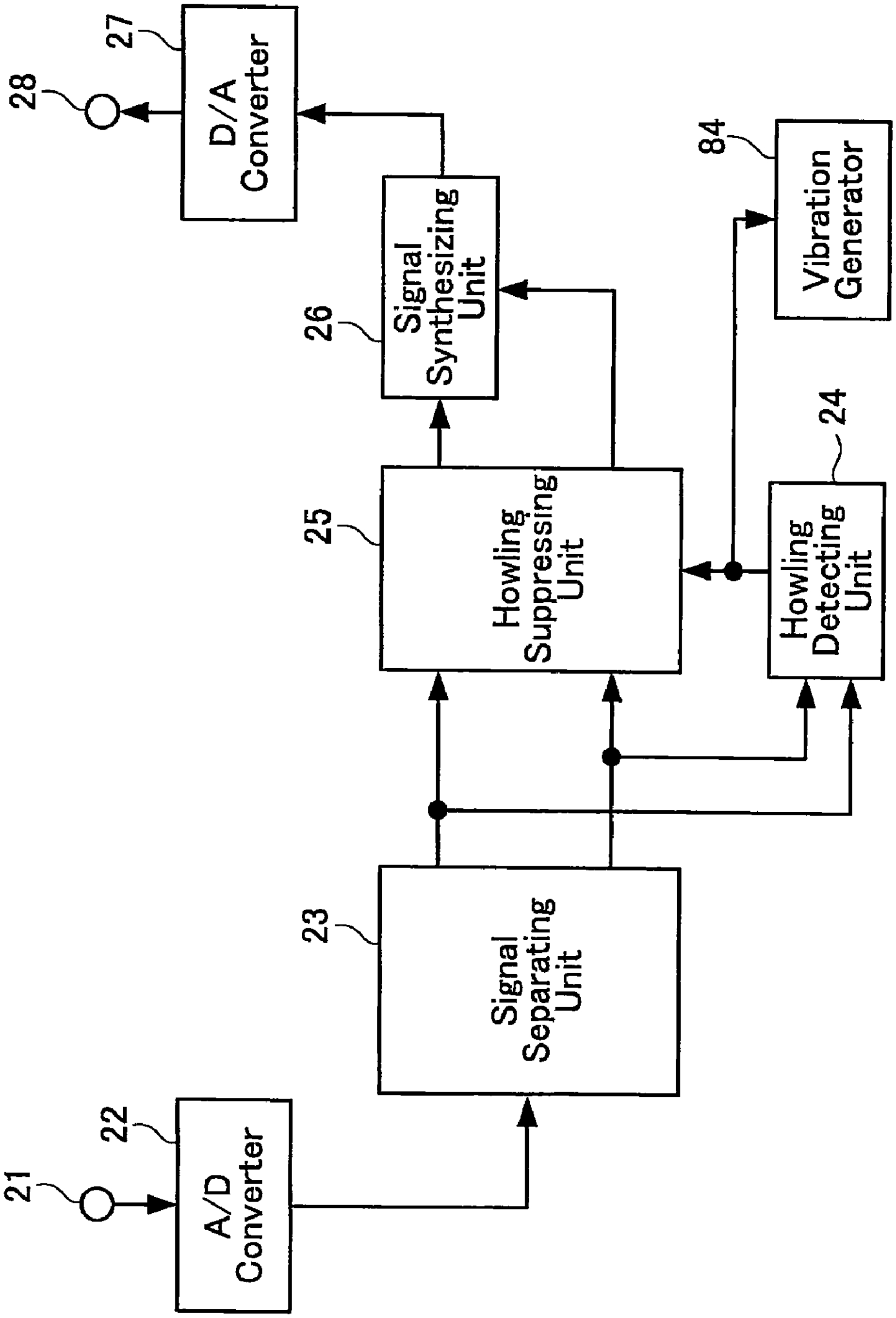
FIG. 9 is a block diagram showing the howling control apparatus according to the sixth embodiment of the present invention.
Figure 10:
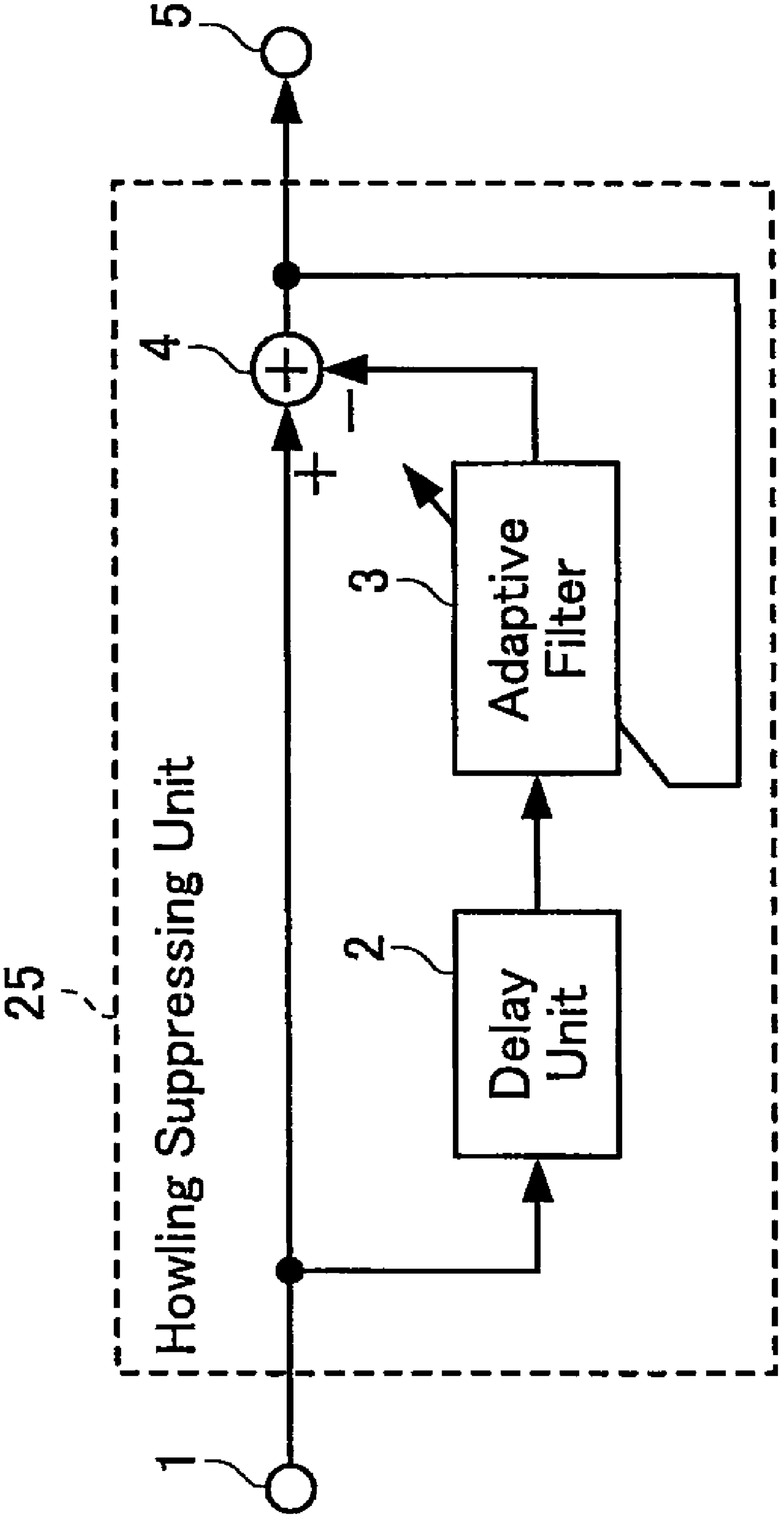
FIG. 10 is a block diagram showing the conventional howling control apparatus.

FIG. 9 is a block diagram showing a howling control apparatus and an acoustic apparatus according to the sixth embodiment of the present invention. The elements of the howling control apparatus and acoustic apparatus according to the sixth embodiment the same as those of the howling control apparatus and acoustic apparatus according to the first embodiment are not described, but bear the same reference numerals as those of the howling control apparatus and acoustic apparatus according to the first embodiment.

As shown in FIG. 9, the howling control apparatus 20 includes elements the same as those of the howling control apparatus according to the first embodiment, and a vibration generator (vibration generating means) 84 operable to generate a vibration on the basis of the detection information from the howling detecting unit 24 to notify a user of the howling component detected from the input signal. The vibration generator 84 is constituted by a vibrator.

The following description is directed to the operation of the howling control apparatus 20 according to the sixth embodiment.

The vibration generator 84 generates a vibration on the basis of the detection information from the howling detecting unit 24 to notify a user of the howling component detected from the input signal.

From the foregoing description, it will be understood that the howling control apparatus and acoustic apparatus according to the sixth embodiment of the present invention can notify a user of the howling component detected from the input signal by generating a vibration on the basis of the detection information about the howling component.

INDUSTRIAL APPLICABILITY OF THE PRESENT INVENTION

As will be seen from the foregoing description, the howling control apparatus and acoustic apparatus according to the present invention can suppress the howling component of the input signal effectively without suppressing a periodic component other than the howling component, and improve a quality of a sound to be outputted from a loudspeaker without being affected by the suppression of the howling component. The howling control apparatus and acoustic apparatus according to the present invention is useful as, for example, an acoustic apparatus having a microphone and a loudspeaker to suppress the howling component generated by an acoustic coupling between the loudspeaker and the microphone, and a howling control apparatus provided with the acoustic apparatus.

What is claimed is:

1. A howling control apparatus, comprising:

a signal separating unit operable to separate an input signal into two components including a periodic component and a nonperiodic component;

a howling detecting unit operable to detect a howling component from said input signal on the basis of a ratio between signal levels of signals selected from among said input signal and periodic and nonperiodic component signals from said signal separating unit;

a howling suppressing unit operable to suppress said howling component of said input signal on the basis of detection information from said howling detecting unit; and a signal synthesizing unit operable to synthesize a signal from signals from said howling suppressing unit.

2. A howling control apparatus according to claim 1, wherein said howling detecting unit detects said howling component from input signal on the basis of the fluctuation of said signal level of said periodic component signal.

3. A howling control apparatus according to claim 1, wherein said howling detecting unit includes a signal level calculating section operable to calculate signal levels of said selected signals, a signal ratio calculating section operable to calculate a relative level ratio indicating a ratio between said signal levels, and a howling judging section operable to judge whether or not said howling component is contained in said input signal on the basis of said relative level ratio calculated by said signal ratio calculating section when said relative level ratio of said periodic component signal is small.

4. A howling control apparatus according to claim 3, wherein said howling judging section judges whether or not said howling component is not contained in said input signal when said relative level ratio of said periodic component signal becomes small, or when said relative level ratio of said periodic component signal becomes large.

5. A howling control apparatus according to claim 3, wherein said howling detecting unit further includes a fluctuation analyzing section operable to perform an analysis of a fluctuation of a signal level of said periodic component signal, and said howling judging section judges whether or not said howling component is contained in said input signal, on the basis of said relative level ratio calculated by said signal ratio calculating section and said analysis of said fluctuation of said of said signal level of said periodic component signal performed by said fluctuation analyzing section, when said relative level ratio of said periodic component signal becomes small, or when said relative level ratio of said periodic component signal becomes large, and when said signal level of said periodic component signal is increased with time.

6. A howling control apparatus according to claim 5, wherein said fluctuation analyzing section calculates a difference between a past signal level of said periodic component signal and a present signal level of said periodic component signal.

7. A howling control apparatus according to claim 5, wherein said fluctuation analyzing section compares a past signal level of said periodic component signal with a present signal level of said periodic component signal.

8. A howling control apparatus according to claim 1, wherein said howling suppressing unit includes a gain control section operable to control at least one gain to be used to suppress said howling component on the basis of detection information from said howling detecting unit, and a gain multiplying section operable to multiply said periodic component signal from said signal separating unit by a gain controlled by said gain control section, or multiplying said periodic and nonperiodic component signals from said signal separating unit by gains controlled by said gain control section.

9. A howling control apparatus according to claim 8, wherein said howling suppressing unit further includes a measuring section operable to measure a duration of said howling component or a duration of said input signal judged as having no howling component, said gain control section controls at least one gain in response to said detection information from said howling detecting unit and said duration measured by said measuring section.

10. A howling control apparatus according to claim 1, wherein said signal separating unit has an adaptive filter operable to extract said periodic component from said input signal.

11. A howling control apparatus according to claim 1, wherein said howling detecting unit performs a howling component detecting operation at specific intervals, and said howling suppressing unit performs a howling component suppressing operation at specific intervals.

12. A howling control apparatus according to claim 1, further comprising a display unit operable to notify a user about whether or not said howling component is contained in said input signal by displaying an image on the basis of said detection information from said howling detecting unit.

13. A howling control apparatus according to claim 1, further comprising a notification sound generating unit operable to notify a user about whether or not said howling component is contained in said input signal by generating a notification sound on the basis of said detection information from said howling detection unit.

14. A howling control apparatus according to claim 1, further comprising a vibration generator operable to notify a user about whether or not said howling component is contained in said input signal by generating a vibration on the basis detection information from said howling detecting unit.

15. An acoustic apparatus comprising said howling control apparatus of claim 1 or claim 2.

* * * * *